Aug. 23, 1960

J. K. CLARK 2,949,959

SAFETY SHUT-OFF VALVE

Filed Feb. 9, 1955

INVENTOR.
James Kendall Clark
BY
John P. Murphy

Aug. 23, 1960

J. K. CLARK 2,949,959

SAFETY SHUT-OFF VALVE

Filed Feb. 9, 1955

INVENTOR.
JAMES KENDALL CLARK
BY
John P. Murphy
ATTORNEY

United States Patent Office 2,949,959
Patented Aug. 23, 1960

2,949,959

SAFETY SHUT-OFF VALVE

James Kendall Clark, New Hartford, N.Y., assignor to The Partlow Corporation, New Hartford, N.Y., a corporation of New York Filed Feb. 9, 1955, Ser. No. 487,068

2 Claims. (Cl. 158—138)

This invention relates to automatic controls for gas burners employed in connection with industrial ovens, heat treating apparatus, cotton gins, and the like, and has especial reference to a novel pilot burner mechanism whereby the supply of gas to burners, as well as to the pilot burners, is controlled thermally and mechanically.

Temperature responsive valves are widely used in connection with the piping and using of combustible gases. These valves may be used to stop the flow of a combustible gas if the temperature becomes high and thus dangerous. Although the valves are designed for closing at a certain temperature, in many installations, such for example, the oil field industry, high corrosive gases are handled at relatively high pressures. The corrosive gas must be completely isolated from the valve temperature responsive mechanism or thermostat assembly to prevent corrosion and thereby sticking of the parts and faulty operation.

One of the objects of my invention is to provide a thermostatically operated control valve wherein any corrosive gases are sealed in and are isolated from the thermostate assembly.

Another object of my invention is to provide a thermostatically operated control valve in which any pressures exerted by the gas being controlled are not transmitted to the thermostatic assembly.

Another object of my invention is to provide a perforated, flexible diaphragm which acts as a guide for the valve and insures the seating of the valve with precision, thus eliminating the possibility of leakage from the improper closing or seating of the valve.

Another object of my invention is to provide a flexible, perforated diaphragm which guides the valve positively into place in the valve seat, thus eliminating any valve guides which are subject to corrosion and which may result in the sticking of the valve and failure to open or close, particularly in the applications where the control is exposed to extremely high corrosive conditions.

Another object of this invention is to provide a thermostatically operated control valve wherein the operation of the valve depends entirely upon the response to temperature and is independent of the manual mechanism for opening and closing the valve.

Other objects and a fuller understanding of my invention may be had by referring to the following description and claims, taken in combination with the accompanying drawing, in which:

Figure 1:
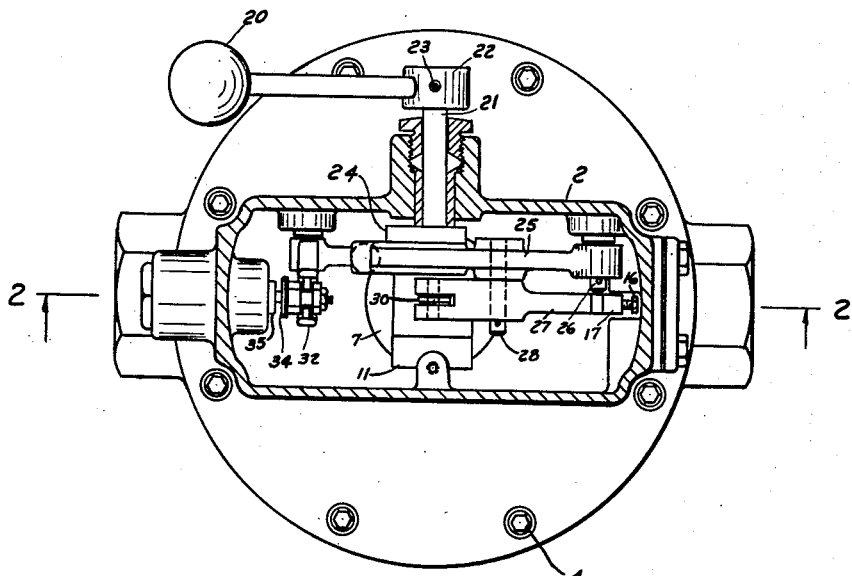
Figure 1 is a top plan view of the valve without the control thermostat assembly with the top of the valve cap cut away to show the inside mechanism and a section through the control lever shaft.
Figure 2:
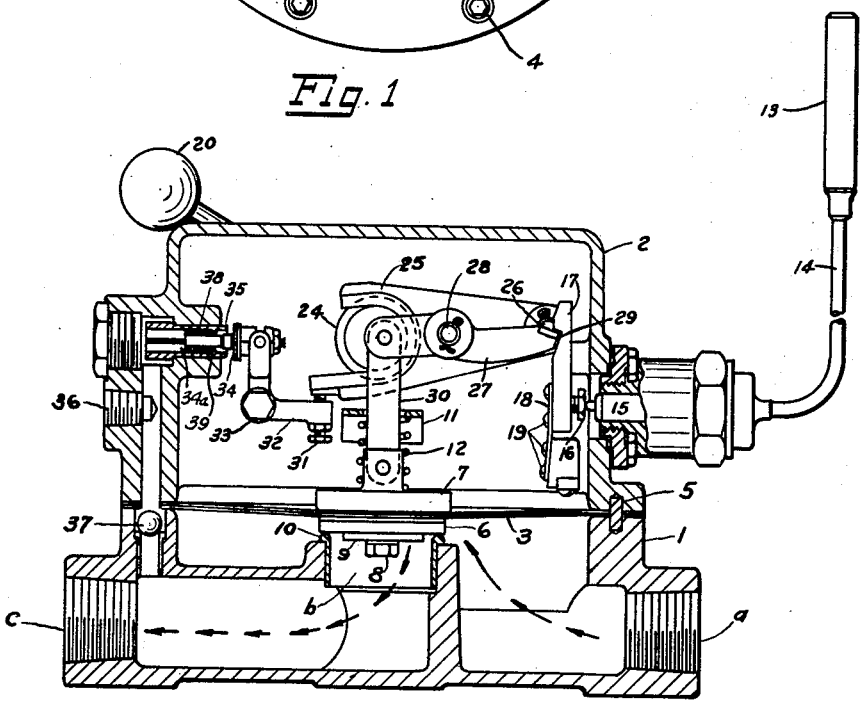
Figure 2 is a vertical longitudinal section with valve shown in a closed position, taken on line 2—2, and showing the control thermostat assembly in place.

Referring to Figures 1 and 2 of the drawings, the valve is composed of a hollow body 1, open at both ends, so that gas may pass from the inlet end (a) through the valve opening (b) and to the burner 40 through the outlet (c), and a hollow cap 2 which houses the valve control mechanism. Between the body 1 and the cap 2 is a strong perforated flexible diaphragm 3, all of which are held together by bolts 4 and a locating pin 5. The valve disc 6 is bolted to the valve plunger 7 with the perforated flexible diaphragm 3 between the two. These are held together by bolt 8 and washer 9, providing a method of guiding the valve disc 6 to the valve seat 10. Anchor 11 is fastened to cap 2 by any suitable means. Spring 12 which holds plunger 7 down, which, in turn, holds valve disc 6 firmly against valve seat 10, is disposed on link 30.

Bulb 13 is fitted in a positional mount on the pilot burner 41, the heat being transmitted through the tube 14 to a mercury actuated element (not shown), forcing a plunger 15 against an adjustment screw 16 fastened to latch lever 17 forcing the latch lever 17 to the left and holding it in this position as long as the bulb 13 is kept hot by the pilot flame. A flat spring 18, fastened to latch lever 17 and the cap 2 by screws 19, holds the lever in position, and at the same time forces it to the right when the plunger 15 is not pushing against latch lever 17.

An operating handle 20 is fastened to a shaft 21 by a collar 22, and pin 23. At the other end of the shaft is an eccentric 24 which rotates with the operating handle 20 either clockwise or counter-clockwise. When the eccentric 24 is rotated, it raises or lowers eccentric lever 25 which is mounted to pivot on pin 26. To this lever is fastened the valve lifting arm 27 which pivots on its mounting pin 28. When one end of the valve lifting arm 27 engages in the notch 29 of the latch lever 17 and eccentric lever 25 is raised by a clockwise rotation of the operating handle 20 this raises the valve lifting arm 27 which pivots into the notch 29 of the latch lever 17 and then raises the valve plunger 7 which is connected to the valve lifting arm 27 by link 30.

Figure 3:
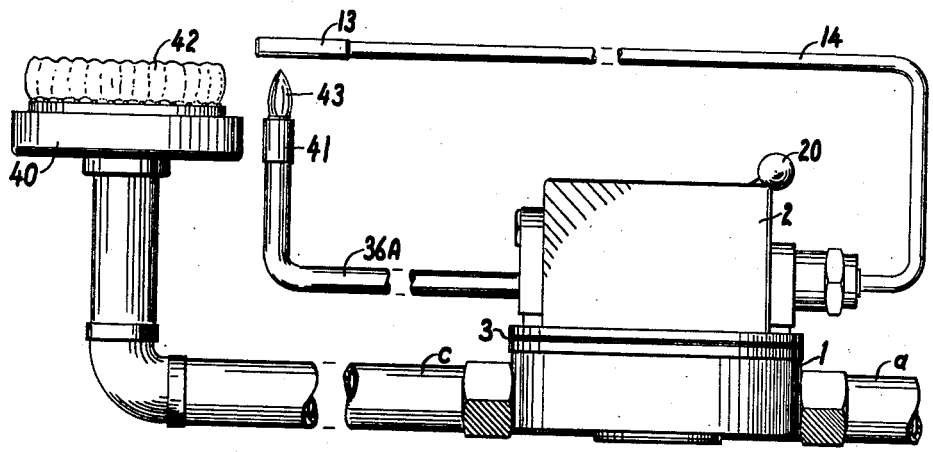
Figure 3 is a diagrammatic illustration of a modification of the invention connected to a main burner and a pilot burner.

With the operating handle 20 in the clockwise position (Figure 3) and the valve open, if the pilot light 43 is extinguished, the bulb 13 cools off, the thermal plunger 15 releases latch lever 17 causing the notch 29 to disengage valve lifting arm 27 causing spring 12 to push the plunger 7 and valve disc 6 firmly on the valve seat 10, thereby closing the valve, even though the operating handle 20 has not moved from its clockwise position.

When the operating handle 20 is moved in a counter-clockwise direction in the position shown in Figure 2, this rotates the eccentric 24 which lower the eccentric lever 25, causing it to press on the adjustment screw 31 which is fastened securely to the pilot valve operating lever 32 which is mounted to pivot on pin 33. Pilot valve operating lever 32 lifts the pilot valve disc 34 from the pilot valve seat 35, thus allowing the gas to come through the perforated diaphragm through the pilot valve through the hole 36 in the valve cap 2 to the pilot burner 41 through pipe 36A. The body of the pilot valve seat 35 extends inwardly forming a channel. The pilot valve stem 34A is fastened to the pilot valve disc 34 so that the stem 34A and the disc 34 move as an integral unit. The pilot valve stem 34A may be substantially rectangular in cross section, as shown in Figure 2, or may be of any cross sectional configuration which is different than the configuration of the channel in which it slides. Thus, a rectangular stem 34A sliding in a tubular channel will leave passage space for the pilot valve gas between the stem 34A and the wall of the channel. Spring 38 is a compression spring disposed in the channel with one end bearing against the end of the valve stem 34A and the other end bearing against an inner flange 39 formed in the body of the valve seat 35. The urging of the spring 38 against the valve stem 34A is adapted to maintain the valve disc 34 closed against the valve seat 35 when the lever 25 is not bearing against the screw 31. Thus it is seen that with the operating handle 20 in the counterclockwise position of Figure 2, the valve disc 34 is opened away from the seat 35, allowing gas to flow from the inside of cap 2 through the channel past the valve stem 34A, and out through the hole 36 to be burned at the pilot burner 41. The burner 41 heats up bulb 13 which causes the thermal plunger 15 to push against the latch lever 17 and a clockwise rotation of the operating handle will again open the valve. When the operating handle is moved clockwise, eccentric lever 25 is raised. This releases pressure on the pilot valve operating lever which permits the urging of the spring 38 to close the pilot valve. Gas is now supplied to the pilot burner 41 by passing through a ball check valve 37 through hole 36 in valve cap 2 to the pilot burner 41.

The present invention thus provides a simple, rugged valve, which can be opened only after its actuating element has been operated from contact with the pilot flame 43. Should the pilot 43 fail or become extinguished, the element cools and releases a latch, allowing the valve to snap shut independently of the main valve operating handle.

The thermostatic element of the valve is mercury filled, its bulb being carried in a positioned mount on the pilot burner 41. The pilot burner is supplied with mounting brackets (not shown) to fit all applications in the oil industry.

It is to be understood that instead of using a mercury filled thermostatic element, the valve may be actuated by electrical means such as a solenoid or by mechanical means such as a diaphragm under pressure.

The valve disc is guided to its seat not by a conventional slip stem, but by a strong perforated diaphragm. This insures that the valve will positively close when called upon to do so, even after being in the open and exposed to corrosion and adverse conditions for long periods of time. There is no slip stem to corrode and stick.

In operation, the pilot valve is incorporated into the body, which can be opened only when the operating handle is moved to the forward position. This will supply just enough gas for the pilot 43. A few moments after the pilot 43 has been lighted, the thermal bulb 13 becomes hot, forcing the thermal element plunger against latch lever 17. The latch lever 17 then moves into a position to act as a fulcrum for the valve lifting arm 27. Moving the operating handle to its original position closes the small pilot valve and opens the main valve. Gas is now fed to the pilot line 36A through a by-pass with ball check valve 37 from the outlet chamber. On extinguishment of the pilot flame 43, the thermal element 13 cools, releasing the latch lever. This allows the main valve to close, shutting off gas supply to both main burner 40 and pilot 41. Since the operating handle does not move on valve closure, it cannot be tied or blocked to supply gas to the main burner 40 with the pilot 41 out.

The control valve described herein has been successfully used for controlling the action of a large valve in the oil field industry, where highly corrosive gases are handled at relatively high pressures. If the flexible diaphragms are constructed of nylon fabric impregnated with Buna n, they have a rupture strength of 600 pounds.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:
1. A safety control valve assembly for pressurized fuel comprising a housing secured on a hollow body including a fuel inlet and outlet with a valve seat interposed therebetween for controlling movement of fuel from said inlet to a main burner connected to said outlet, a first valve displaceably supported in said housing for engagement with said valve seat, biasing means in said housing in engagement with said valve and normally urging the same toward seated relation on said valve seat, manually operable control means supported by said housing in engagement with said valve for displacing it from the valve seat, a thermally operated latch in said housing adapted to be actuated in the presence of a predetermined pilot burner temperature to provide a fulcrum, lever means operatively connected between said manually operable control means and said fulcrum to permit said valve to be moved when said control means is operated, a pilot burner outlet communicable with said inlet, pilot valve means interposed between said pilot burner outlet and inlet and normally biased toward a closed position, force transmitting means on said manually operable control means and engageable with said pilot valve means for opening the same and permitting fuel to be directed to a pilot burner, and a one-way valve interposed between said outlet and pilot burner outlet, said force transmitting means on said manually operable control means disengaging said pilot valve means upon movement of said manually operable control means toward a position in which said thermally operated latch retains said valve open.

2. A safety control valve assembly for pressurized fuel comprising a housing secured on a hollow body including a fuel inlet and outlet with a valve seat interposed therebetween for controlling movement of fuel from said inlet to a main burner connected to said outlet, a first valve displaceably supported in said housing for engagement with said valve seat, biasing means in said housing in engagement with said valve and normally urging the same toward seated relation on said valve seat, manually operable control means supported by said housing in engagement with said valve for displacing it from the valve seat, a thermally operated latch in said housing adapted to be actuated in the presence of a predetermined pilot burner temperature to provide a fulcrum, lever means operatively connected between said manually operable control means and said fulcrum to permit said valve to be moved when said control means is operated, a pilot burner outlet communicable with said inlet, pilot valve means interposed between said pilot burner outlet and inlet and normally biased toward a closed position, force transmitting means on said manually operable control means and engageable with said pilot valve means for opening the same and permitting fuel to be directed to a pilot burner, and a one-way valve interposed between said outlet and pilot burner outlet, said force transmitting means on said manually operable control means disengaging said pilot valve means upon movement of said manually operable control means toward a position in which said thermally operated latch retains said valve open, said valve being suspended on a perforated flexible diaphragm facilitating the seating of the same on said valve seat.

References Cited in the file of this patent
UNITED STATES PATENTS

| | | |
|---|---|---|
| 1,975,142 | Fonseca | Oct. 2, 1934 |
| 2,179,633 | Jenkins | Nov. 14, 1939 |
| 2,381,926 | Ray | May 20, 1941 |
| 2,301,876 | Hurlburt | Nov. 10, 1942 |
| 2,332,108 | Paille | Oct. 19, 1943 |
| 2,496,638 | Ray | Feb. 7, 1950 |